(No Model.)
E. P. TRUMBULL.
PIPE JOINT.
No. 248,680. Patented Oct. 25, 1881.
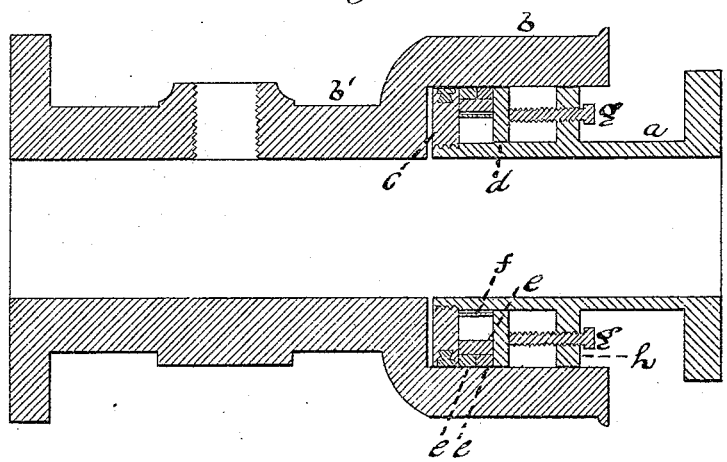
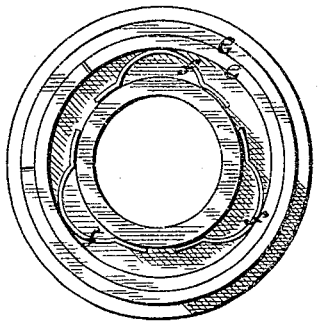
WITNESSES:
Chas. L. Burdett.
James J. Greene
INVENTOR
Edward P. Trumbull
BY W. E. Simonds
ATTORNEY

UNITED STATES PATENT OFFICE.

EDWARD P. TRUMBULL, OF HARTFORD, CONNECTICUT.

PIPE-JOINT.

SPECIFICATION forming part of Letters Patent No. 248,680, dated October 25, 1881.

Application filed February 4, 1881. (No model.)

*To all whom it may concern:*

Be it known that I, EDWARD P. TRUMBULL, of Hartford, in the county of Hartford and State of Connecticut, have invented a certain new and useful Improvement in Extension-Joints for Pipes, of which the following is a description, reference being had to the accompanying drawings, where—

Figure 1 is a view of a pipe-joint made in accordance with my improvement. Fig. 2 is an end view of the inner end of the pipe—including the ringed head—which enters the other pipe, with the flange or collar which, on this side, incloses the rings of the head removed, so as to expose the rings and springs to a side view.

The object aimed at is a joint in steam and other pipes which safely allows the pipes which meet at the joint to expand and contract by heat and cold.

The letter *a* denotes a pipe, which enters pipe *b* in making this joint. I therefore call the former a "male" pipe and the latter a "female" pipe. The female pipe is larger than the male pipe, in order to receive the ringed head which is on the male pipe; but it is diminished by the pipe-continuation *b'* to substantially the size of the male pipe.

The letter *c* denotes a collar or flange upon the male pipe, which is removable therefrom, to which end it may be screwed thereupon and fastened from rotation by a pin or key.

The letter *d* denotes a collar which is loose on the male pipe, that it may move longitudinally thereon. These two collars *c* and *d*, with the intermediate rings and springs, form what I call herein the "ringed head."

The letters *e* denote the rings, which are each cut in twain obliquely at one point, that they may be expanded and contracted, and the springs *f* push these rings outward to close contact with the bore of the female pipe, forming a tight joint by means of the ringed head, which can move longitudinally in the bore of the female pipe.

The letters *g* denote adjusting-screws borne by (a collar, *h*, which may as well be lugs projecting from) the male pipe, and bearing on the loose collar *d*, to force it to place.

In the assembling of a large apparatus made in accordance with this improvement the loose collar *d* is run back nearly to the collar *h*; then the rings are put over the end of the male pipe and the collar *c* screwed on and fastened; then collar *c* and the rings are entered within the female pipe; then the springs are separately forced into place, and finally the loose collar is forced to place by means of the screws *g*.

If desired—and I can see that in some cases it is desirable—an adjusting-screw can be set behind each one of the springs.

I claim as my improvement—

1. In combination, the female pipe *b*, the male pipe *a*, the collars *c d*, and the packing-rings and springs, all substantially as described, and for the purpose set forth.

2. In combination, the male pipe *a*, bearing the adjusting-screws *g*, the loose collar *d*, the removable collar *c*, and the intermediate rings and springs, all substantially as described, and for the purpose set forth.

EDWARD P. TRUMBULL.

Witnesses:
W. E. SIMONDS,
JAMES J. GREENE.